US008219990B2

(12) United States Patent
Khanna

(10) Patent No.: US 8,219,990 B2
(45) Date of Patent: Jul. 10, 2012

(54) TECHNIQUES FOR MANAGING VIRTUAL MACHINE (VM) STATES

(75) Inventor: Saurabh Khanna, Laxmi Nagar (IN)

(73) Assignee: Novell, Inc., Provo, UT (US)

( * ) Notice: Subject to any disclaimer, the term of this patent is extended or adjusted under 35 U.S.C. 154(b) by 482 days.

(21) Appl. No.: 12/473,436

(22) Filed: May 28, 2009

(65) Prior Publication Data
US 2010/0306764 A1 Dec. 2, 2010

(51) Int. Cl.
G06F 9/455 (2006.01)
G06F 21/00 (2006.01)
(52) U.S. Cl. .............................. 718/1; 711/6
(58) Field of Classification Search .......... 718/1; 711/6, 711/E12.016
See application file for complete search history.

(56) References Cited

U.S. PATENT DOCUMENTS

| 7,200,705 | B2 | 4/2007 | Santos et al. | |
| 7,296,194 | B1 | 11/2007 | Lovy et al. | |
| 7,415,708 | B2 | 8/2008 | Knauerhase et al. | |
| 7,509,540 | B1 | 3/2009 | Lovy et al. | |
| 2006/0004554 | A1* | 1/2006 | Vega et al. | 703/6 |
| 2007/0074208 | A1* | 3/2007 | Ling et al. | 718/1 |
| 2007/0130305 | A1 | 6/2007 | Piper et al. | |
| 2009/0006728 | A1 | 1/2009 | Green | |
| 2010/0218183 | A1* | 8/2010 | Wang et al. | 718/1 |

* cited by examiner

Primary Examiner — Thomas Lee
Assistant Examiner — Terrell Johnson
(74) Attorney, Agent, or Firm — Schwegman, Lundberg, & Woessner, P.A.

(57) ABSTRACT

Techniques for managing virtual machine (VM) states are provided. Applications executing within a processing context of a VM communicate outside that processing context with a hypervisor or VM Monitor (VMM) to have the hypervisor perform host operations for the VM.

18 Claims, 6 Drawing Sheets

TECHNIQUES FOR MANAGING VIRTUAL MACHINE (VM) STATES

BACKGROUND

Virtualization has been gaining popularity in today's highly-connected economy. Enterprises see virtualization as an opportunity to maximize the efficiency and utilization of existing hardware resources, so that the enterprises can expand without unnecessary expenses for additional hardware when existing hardware is underutilized.

A virtual machine (VM) permits an isolated processing environment to exist on a physical machine (host), which may run an entirely different processing environment. A virtual machine monitor (VMM) or hypervisor is used to manage multiple VM's running on a single underlying host machine.

The processing state of a VM may be needed for a variety of reasons, such as: when a failure occurs with the VM, when a condition needs to be recreated, when work is to be check pointed, etc.

Currently, hypervisor products in the industry permit VM states to be saved at particular points in time (e.g., snapshots). This functionality has to be invoked via a hypervisor interface or via command line tools. In each instance, the industry products require access to the host machine when the VM state is to be saved.

However, if a user has access to a VM but not the host machine that runs the VM, then the user cannot save a state of his VM when desired. Another issue is that a user may want to programmatically save the VM state via VM applications being used or developed by the user; this cannot be done with existing approaches that require access to the hypervisor interface and proper access rights before the VM state can be saved. In a related problem, VM applications cannot take selective actions based on VM state changes because VM applications are not aware and are not permitted to be aware of VM state changes with existing products.

In fact, existing products require that a hypervisor be on the host machine before a VM state can be saved or changed. This is too inflexible and rigid for enterprises' VM needs and requirements.

Thus, improved techniques for managing VM states are needed.

SUMMARY

In various embodiments, techniques for managing virtual machine (VM) states are provided. More specifically, and in an embodiment, a method is provided for managing a state of a VM. A request to save a state of a Virtual Machine (VM) is received; the request is received within a processing context of the VM. Next, the request is passed to a hypervisor that executes outside the processing context of the VM. An event is subsequently detected; the event is raised by the hypervisor indicating the state was saved for the VM. Finally, one or more VM applications executing within the processing context of the VM are notified that the state was saved for the VM.

DETAILED DESCRIPTION

Figure 1:
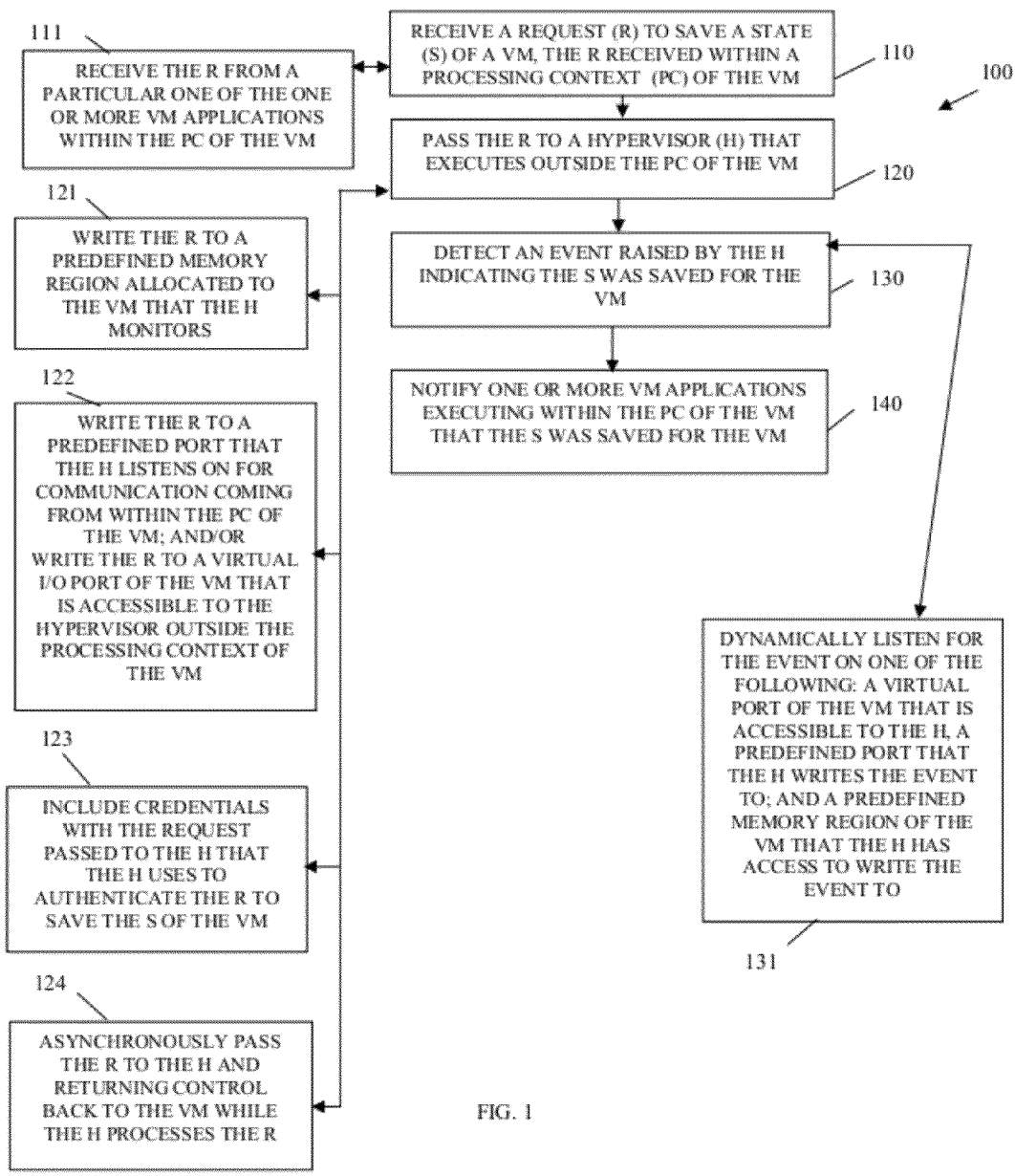
FIG. 1 is a diagram of a method for saving a state of a VM, according to an example embodiment.

A "resource" includes a user, content, a processing device, a node, a service, an application, a system, a directory, a data store, groups of users, combinations of these things, etc. Resources can interact with each other and can either act on other resource or be acted upon by other resources. The terms "service," "process," and "application" may be used interchangeably herein and refer to a type of software resource that includes instructions, which when executed by a machine (processor) performs operations that change the state of the machine and that may produce output.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The term "Virtual Machine (VM)" refers to a logical representation of a physical machine (computing device, processor, etc.) and its processing environment (operating system (OS), software resources, etc). The VM is maintained as software that executes on an underlying host machine (physical processor or set of processors). From the perspective of a user or software resource, the VM appears to be its own independent physical machine.

A "hypervisor or VM Monitor (VMM)" refers to a processing environment or platform service that manages and permits multiple VM's to execute using multiple (and sometimes different) OS's on a same host machine.

A "VM state" refers to a unique configuration and/or set of information and resources that occurs within a particular VM at a particular point in time.

Various embodiments of this invention can be implemented in existing software products as enhancements thereto, OS's, VM services, hardware interfaces, etc. For example, in some embodiments, the techniques presented herein are implemented in whole or in part in the Novell® network, proxy server products, email products, operating system products, VM produces, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-7.

FIG. 1 is a diagram of a method 100 for saving a state of a VM, according to an example embodiment. The method 100 (hereinafter "VM state saving service") is implemented as instructions residing in a machine-accessible and computer-readable storage medium. The instructions reside in a machine and are executed by the machine (computer, processor, or processor-enabled device) to perform the processing depicted in FIG. 1. The VM state saving service is also operational over and processes within a network. The network may be wired, wireless, or a combination of wired and wireless.

The VM state saving service executes on a processor as a management service within a processing context of a VM.

At 110, the VM state saving service receives a request to save a state of the VM. The request is received from within the processing context of the VM. That is, an Application that is executing on a guest machine VM (not the host or supervisory machine of the VM) makes a request that is received by the VM state saving service from within the processing environment of the VM. This processing context is different from the host processing context, which may even include an entirely different OS from that which is associated with the VM. So, the available resources, file system, OS, etc. can be completely different (type and/or version) within the processing context from the host that executes the VM. The host that executes the VM and other VM's that may execute on the host are associated with an external and outside processing context or processing environment.

According to an embodiment, at 111, the VM state saving service receives the request from a particular one of the one or more VM applications within the processing context of the VM. This initial request to save the VM state is made entirely within the VM processing environment and is not initially made via a hypervisor interface that executes on the host machine. It is noted that the hypervisor may be considered a VM Monitor (VMM) that manages the VM and one or more other VM's that execute on the host machine.

At 120, the VM state saving service passes the request to the hypervisor. The hypervisor executes outside the processing context of the VM and within the host processing context. This communication from within the processing context of the VM to outside the processing context of the VM can be achieved in a number of different manners. It is noted that the hypervisor used herein is modified and enhanced to perform the communication discussed herein.

For example, at 121, the VM state saving service can write the request to a predefined memory region that was pre-allocated to the VM. This predefined memory region can be actively monitored by the hypervisor.

In still another case, at 122, the VM state saving service writes the request to a predefined communication port of the VM, which the hypervisor actively and dynamically monitors or listens on for communication coming from within the processing context of the VM.

In yet another situation, at 122, the VM state saving service writes the request to a virtual Input/Output (I/O) port that is accessible to the hypervisor. Again, the hypervisor is executing outside the processing context of the VM and actively monitors (dynamically and in real time) the virtual I/O port that is configured to be shared with the VM state saving service.

According to an embodiment, at 123, the VM state saving service can also include credentials with the request that is passed to the hypervisor. The hypervisor uses the credentials to authenticate the request to save the state of the VM. The type of credentials and format of the credentials can be driven by policy that the hypervisor and the VM state saving service are configured to evaluate and enforce. In some cases, the credentials establish an authorized identity for the requesting VM application and can also authenticate the identity of the VM state saving service and even the identity of the VM.

In still another circumstance, at 124, the VM state saving service passes the request to save the state along to the hypervisor asynchronously. Once the asynchronous passing of the request occurs, the VM state saving service returns processing control back to the requesting VM application and the VM so it can continue to process within the processing context. This ensures there is no deadlock that can occur should the hypervisor alter the configuration of the VM, such that the VM state saving service is not in an infinite loop waiting pattern for return communication from the hypervisor. This situation is described in greater detail below with reference to the FIGS. 5-7.

At 130, the VM state saving service detects an event raised by the hypervisor indicating that the state for the VM was saved. Again, this detection is made asynchronously by the VM state saving service. This detection of the raised event can occur in a variety of manners similar to what was presented above with reference to the processing at 122-123.

So, in an embodiment at 131, the VM state saving service can dynamically listen for the event one or more of the following: a virtual I/O port that is shared and accessible to the hypervisor and the VM state saving service; a predefined port that the hypervisor writes the event to and that the VM state saving service is configured to dynamically listen on; and a predefined memory region for the VM that the hypervisor has access to write the event to and that the VM state saving service dynamically monitors.

Finally, at 140, the VM state saving service notifies one or more VM applications (which are executing within the processing context of the VM) that the state for the VM was saved. These VM applications can include the requesting VM application and other additional VM applications. The VM applications may be configured to take other actions in response to a successful VM state saving notification event.

It is now understood how control for saving VM state can be made available to VM applications within a processing context of the VM and without manual intervention requiring direct and manual access to a hypervisor's User Interface (UI). The modified hypervisor of the present technique also facilitates the saving of the VM state via dynamic and automated mechanisms as discussed with reference to the processing presented with the FIG. 1.

Figure 2:
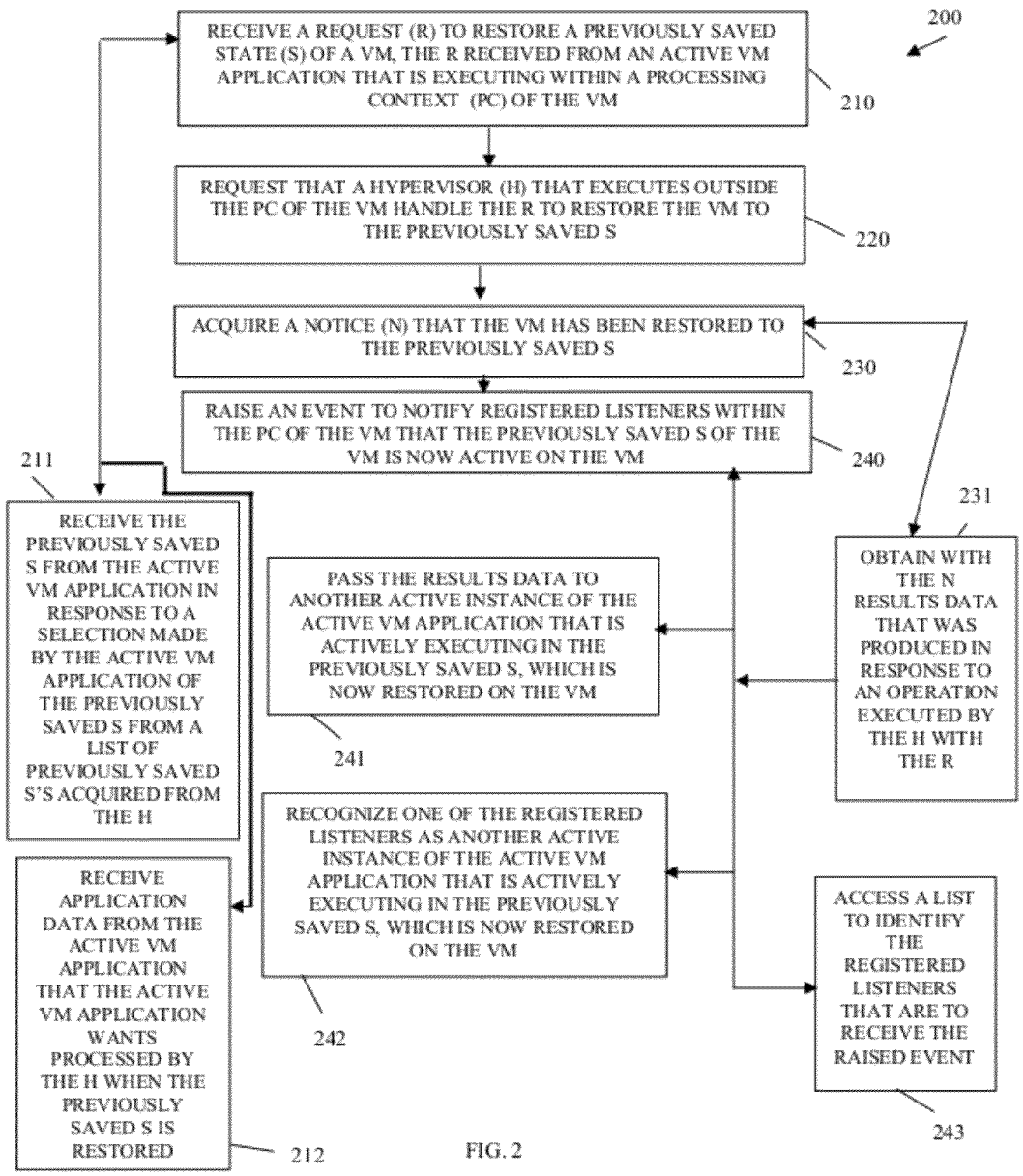
FIG. 2 is a diagram of a method for restoring a state to a VM, according to an example embodiment.

FIG. 2 is a diagram of a method 200 for restoring a state to a VM, according to an example embodiment. The method 200 (hereinafter "VM state restoring service" is implemented and resides in a machine-accessible and computer-readable storage medium as instructions. The instructions reside in a machine and are executed by the machine (one or more processors) to perform the processing depicted in the FIG. 2. Moreover, the VM state restoring service is operational over a network, and the network may be wired, wireless, or a combination of wired and wireless.

The VM state restoring service provides a processing perspective of a VM having a state restored whereas the VM state saving service represented by the method 100 of the FIG. 1 demonstrated a processing perspective of initially saving the state for the VM that the VM state restoring service subsequently restores. Both features of saving and restoring VM state can be made via a same module, such as a VM helper process (discussed below with reference to the FIGS. 3-7).

That is, both the methods 100 and 200 can be implemented into a single processing module that executes within a processing context of a VM.

At 210, the VM state restoring service receives a request to restore a previously saved state of a VM. The request is received from an active VM application that is executing within a processing context of the VM.

According to an embodiment, at 211, the VM state restoring service receives the previously saved state from the active VM application in response to or based on a particular selection made by the active VM application. This selection can be made from a list of previously saved and recorded states for the VM. The list can be dynamically maintained and acquired in an automated fashion from a hypervisor that executes outside the processing context of the VM.

In an embodiment, at 212, the VM state restoring service receives application data from the active VM application. The application data can be considered parameter data that the active VM application wants the hypervisor to use in executing a particular operation on behalf of the VM application. That operation takes as input the parameter data supplied by the active VM application. The hypervisor performs the operation when restoring the state of the VM on behalf of the active VM application. The operation can be any exposed Application Programming Interface (API) operation that is reserved for the hypervisor on the host machine of the VM. Again, any such operation (including the request to restore the state) can also be authenticated based on security and access restrictions by the VM state restoring service and/or the hypervisor before being processed.

At 220, the VM state restoring service requests that the hypervisor, which executes outside the processing context of the VM, handle the request to restore the VM to the previously saved state identified by the active VM application. The manner in which the request is made from the VM state restoring service to the hypervisor can be achieved using the mechanisms discussed above with respect to the method 100 of the FIG. 1.

At 230, the VM state restoring service acquires a notice that the VM has been restored to the previously saved state as requested by the active VM application. At this point in time, the requesting VM application may or may not be active within the VM for the new configuration and the restored state. By now, the VM was reconfigured to the restored state and the initial requesting VM application may or may not be actively executing with the VM in the new restored state. The VM state restoring service is active in each VM state and is part of the boot up process with the VM. Moreover, the VM state restoring service uses asynchronous communication, such that when the new restored state is established it detects the notice received from the hypervisor about the new restored state being established.

According to an embodiment, at 231, the VM state restoring service obtains with the notice results data, which was produced in response to an operation executed by the hypervisor with the request to restore the previously saved state. So, indirect and automatic communication can occur between the active VM application and the hypervisor via the VM state restoring service. Any number of authorized and exposed hypervisor operations can be processed on behalf of the active VM application, the results of executing the operations can be returned with the notice in the form of results data. Tagged information can be used to delineate portions of the results data and to instruct the VM state restoring service on to whom the results data are to be reported to when the state is restored.

At 240, the VM state restoring service raises an event to notify registered listeners within the processing context of the VM that the previously saved state of the VM is now active on the VM. So, prior to having the state of the VM restored and during the state that existed before the restoration process, one or more VM application register a desire to have notice when they are restarted and begin processing in the restored state.

In an embodiment, at 241 and continuing with the previous embodiment discussed with reference to the processing at 231, the VM state restoring service passes the results data to another active instance of the VM application that is actively executing in the previously saved state, which has now been restored on the VM. Here, the active VM application was previously active in the restored state and is thusly again active when the restored state is re-established by the hypervisor. The active VM application can then receive asynchronous communication having the results data for the operation that was requested by different active instances of the VM application. Stated another way, two entirely separate instances of a VM application (one that was active in a prior state of the VM and one that is presently active in a state that requests the prior state to be restored) can actively pass data and messages to instances of itself via the mechanism discussed herein. An active VM application makes a request to restore to a previous state and passes parameter data for some operation to be performed by the hypervisor when restoring to the previous state. That active VM application is not present when the previous state is restored but another instance of the VM application is present and is activated and initiated in the restored state, this newly established instance of the VM application now receives results data from the operation that the hypervisor took on behalf of the now terminated instance of the VM application. So, two different instances of VM applications effectively communicate asynchronously with one another and can pass messages to one another.

In an embodiment, at 242, the VM state restoring service recognizes one of the registered listeners as another active instance of the active VM application (which is now terminated when the previous state is restored within the VM). Again, this is a situation where the original request VM application also has an active instance of itself that is executed and initiated when the previous state of the VM is restored.

In one situation, at 243, the VM state restoring service access a list to identity the registered listeners that are to receive the raised event. The list can be maintained via the hypervisor of via different instances of the VM state restoring service that are active for each state of the VM (as discussed above).

Figure 3:
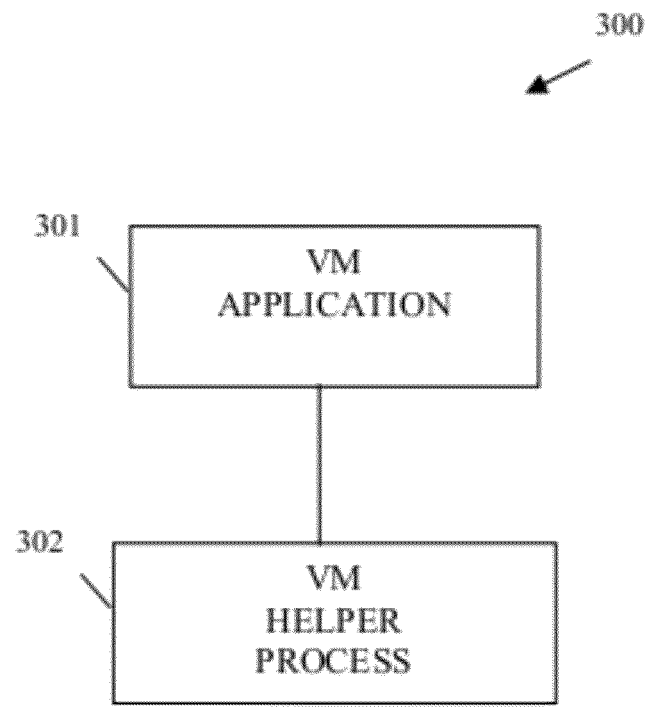
FIG. 3 is a diagram of a VM state management system, according to an example embodiment.

FIG. 3 is a diagram of a VM state management system 300, according to an example embodiment. The VM state management system 300 is implemented and resides in a machine-accessible and computer-readable storage medium as instructions. The instructions are executed by one or more processors (that form a machine (e.g., computer)) to perform the processing depicted in the FIG. 1. Moreover, the VM state management system 300 is operational over a network, and the network may be wired, wireless, or a combination of wired and wireless.

It is again noted that the components and processing depicted the VM state management system 300 reside and are executed on one or more processors that comprise a machine.

The VM state management system 300 includes a VM application 301 and a VM helper process 302. Each of these and their interactions with one another will now be discussed in turn.

The VM application 301 is implemented within and resides within a computer-readable storage medium and executes on one or more processors within an internal processing context of a VM. Example aspects of the VM application 301 were discussed in detail above with reference to the methods 100 and 200 of the FIGS. 1 and 2, respectively. The VM application 301 can be any third-party application that is modified and enhanced to interact with the VM helper process 302.

The VM application 301 includes features that permit the VM application 301 to directly or indirectly communicate with the VM helper process 302 for purposes of requesting that a state for the VM be saved or recorded. As noted above and below, the VM application 301 may also include features that permit the VM application 301 to directly or indirectly communicate with the VM helper process 302 for purposes of restoring a VM state or executing an exposed operation of a VMM.

The VM application 301 is configured to issue a request to save a VM state. Again, the request is issued to the VM helper process 302.

According to an embodiment, the VM application 301 is configured to register with the VM helper process 302 to receive notifications from the VMM about or for the VM.

In another case, the VM application 301 is configured to pass credentials to the VM helper process 302. The VM helper process 302 communicates to the VMM the credentials and the VMM uses the credentials to authenticate the VM application 301 before saving the state of the VM on behalf of the VM application 301.

The VM helper process 302 is implemented within and resides within a computer-readable storage medium and executes on the one or more processors within the internal processing context of the VM. Detailed processing aspects of the VM helper process 302 were presented above with reference to the methods 100 and 200 of the FIGS. 1 and 2, respectively.

The VM helper process 302 is configured to communicate outside the internal processing context of the VM with the VMM for purposes of having the VMM save the state of the VM on behalf of the VM application 301. This can be achieved in a number of manners.

According to an embodiment, the VM helper process 302 is configured to communicate with the VMM via one or more of the following: a reserved portion of memory and/or storage reserved for the VM; a virtual I/O port that the VMM has access to; and/or a predefined designated port that the VMM actively and dynamically monitors. This communication occurs as an enhancement to conventional based VMM's because it is done outside the convention manual UI of the VMM and done in an automated and dynamic fashion that has heretofore been unavailable in the industry.

In an embodiment, the VM helper process 302 is configured to asynchronously communicate with the VMM.

In yet another situation, the VM helper process 302 is configured to notify the VM application 301 when the VM helper process 302 receives notice that the VMM has successfully saved the state of the VM on behalf of the VM application 301.

Figure 4:
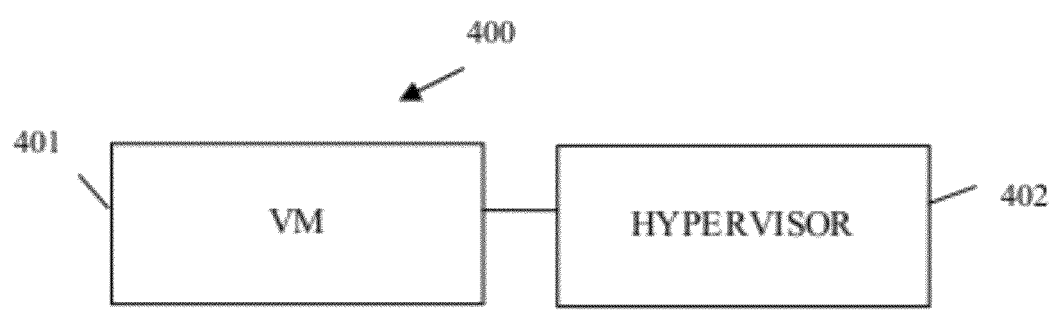
FIG. 4 is a diagram of another VM state management system according to an example embodiment.

FIG. 4 is a diagram of another VM state management system 400 according to an example embodiment. The VM state management system 400 is implemented as instructions on and within a machine-accessible and computer-readable storage medium. The instructions are executed by one or more machines (computer(s), processors, or processor-enabled device(s)) and perform various aspects of the processing depicted with respect to the methods 100 and 200 of the FIGS. 1 and 2, respectively. The VM state management system 400 is also operational over a network and the network may be wired, wireless, or a combination of wired and wireless.

The VM state management system 400 includes a VM 401 and a hypervisor 402. Each of these components and their interactions with one another will now be discussed in turn.

The VM 401 is implemented in a computer-readable storage medium and executes on one or more processors. Example aspects of the VM 401 within the context of embodiments of the invention have been described at length herein and above.

The hypervisor 402 is implemented in a computer-readable medium and executes on the one or more processors outside a processing context of the VM 401. Example aspects of the hypervisor 402 were also discussed at length herein and above. The hypervisor 402 is a modified and enhanced version of a VMM designed to perform the embodiments presented herein.

The hypervisor 402 is configured to expose selective portions of its API to a VM helper process (such as the VM helper process 302 of the FIG. 3 and such as the methods 100 and 200 of the FIGS. 1 and 2, respectively). The VM helper process executes inside a processing context of the VM 401. The hypervisor 402 is further configured to perform one or more operations from the API on behalf of the VM helper process and then communicate results associated with performing those operations back to the VM helper process.

According to an embodiment, the hypervisor 402 is configured to restore the VM 401 to a previously saved state when processing a select one of the operations on behalf of the VM helper process. This state restoration processing from the perspective of the VM helper process was presented in detail above with reference to the method 200 of the FIG. 2.

In another case, the hypervisor 402 is configured to reconfigure the VM 401 in response to or based on parameters received from the VM helper process when the hypervisor 402 executes a select one of the operations on behalf of the VM helper process.

In still another situation, the hypervisor 402 is configured to process parameter data when processing a select one of the operations on behalf of the VM helper process and then communicate back to the VM helper process another set of data, which is obtained from processing the select operation. This situation was described at length above with reference to the method 200 of the FIG. 2.

In another circumstance, the hypervisor 402 is configured to receive communication from the VM helper process via a first defined port within the VM 401; and the hypervisor 402 is further configured to communicate results back to the VM helper process via a second predefined port within the VM 401.

Figure 5:
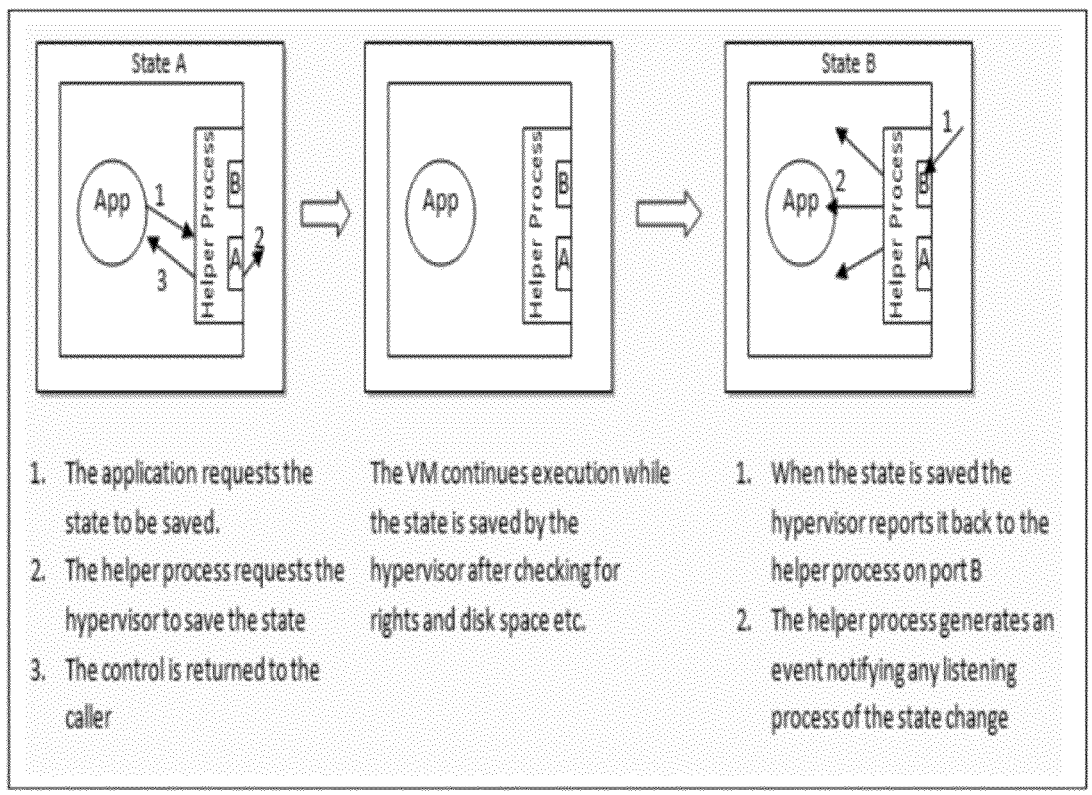
FIG. 5 is a diagram depicting example interactions of the techniques presented herein for saving a VM state, according to an example embodiment.

FIG. 5 is a diagram depicting example interactions of the techniques presented herein for saving a VM state, according to an example embodiment.

A process runs on the VM, which contacts the hypervisor (Virtual Machine Monitor (VMM)) to perform certain tasks and exposes utility commands/Application Programming Interfaces (API's), which can be used by other programs to initiate tasks that change the state of the VM. This is identified in FIG. 5 as the VM helper process (described above with respect to the FIGS. 1-4). The hypervisor listens to incoming requests from this process and provides this functionality. The helper process talks to the hypervisor on one port (port A) and listens for events from hypervisor on another port (port B).

The communication between the VM (by the VM helper process) and the hypervisor can be enabled in various ways, for example:

Through a virtual Input/Output (I/O) port. The VM helper process writes to this port from the VM and the hypervisor access the information and replies the same way.

The hypervisor can access a predefined memory region in the VM's memory, which is updated by both the hypervisor and VM for communication, etc.

The hypervisor can intercept all network communication from the VM on a particular port.

When the VM needs to save its state, the VM helper process contacts the hypervisor on port A and requests this functionality asynchronously. When the hypervisor completes the request for saving state, the hypervisor informs the helper process running on the VM by generating an event which the helper process listens for on port B. This is done asynchronously, since the VM state has to be consistent. If the call were synchronous, the VM state is saved during the processing of the synchronous call. When the VM is reverted back to the saved state, the VM helper process is waiting for a response from the hypervisor, which will never happen.

Consider an example of the problems that are associated with synchronous communication. Initially, the VM is at state A. The VM helper process requests saving of the current state in a synchronous blocking call. After the state is changed to state B, the hypervisor returns the new state name back to the VM helper process completing the blocking call. The problem occurs when the VM is restored back to the state A, which still has the VM helper process waiting to get the control back from hypervisor, since its process state was also saved along with the VM state. The hypervisor is not performing any operations since these operations were requested earlier. Therefore, the VM helper process keeps waiting for an event, which never happens. To solve this problem requests for VM state changes are managed asynchronously.

FIG. 5 illustrates this asynchronous management of saving the state of a VM from within a VM as follows.

An application running in the VM requests the state of the VM to be saved by contacting the helper process. The helper process requests an operation from the hypervisor and returns the control to the caller. The helper process does not wait for a response from the hypervisor. The hypervisor in turn queues the request to be performed. When the hypervisor is done with the requested changes, the hypervisor reports back to the helper process on port B by raising an event thus making the whole process asynchronous. The helper process does not keep waiting for the state changes to happen, making the process asynchronous and solving the above mentioned problem.

When the state is restored back to an earlier state (described above with respect to the method 200 of the FIG. 2 and below with respect to FIG. 6), the helper process is not blocked on any earlier requests. The hypervisor reports the state change by generating an event on port B (the port where helper process listens to for events from the hypervisor). On receiving an event from the hypervisor signaling a state change (save/restore), the helper process generates an event to all the registered listeners in the VM (if any) notifying of the state change, thus completing the restore.

Authentication is also included in the process to enable the hypervisor to check whether the user requesting the operation has enough rights to perform this operation. The rights can be defined initially through the hypervisor User Interface (UI) running on the host machine, by an administrator. When a user requests an operation to be performed through the VM helper, the user gives his/her credentials, which are matched by the hypervisor against stored credentials prior to performing the task.

So an example complete process of saving the VM state (according to some aspects of the invention) proceeds as follows:

The hypervisor listens to the VM helper process requests by intercepting all requests made by the VM helper process on a specified port (port A—first port).

The user (can be application within a VM) requests a VM state to be saved through the helper process and gives the proper credentials for authentication.

The VM helper process requests the hypervisor to save the state by contacting the hypervisor on the port passing the user credentials and then the VM helper process closes the connection.

The hypervisor queues the request and checks to ensure that the user has enough rights (security permissions—access rights) to perform this operation and then checks to see if request can be fulfilled (e.g., does host machine running the VM have enough hard disk space etc). The task is then performed.

When the hypervisor has completed the request. The hypervisor contacts VM helper process through port B (second port (where the VM helper process keeps listening for any events being raised by the hypervisor)) and sends the task completion status (e.g., success/failure).

The helper process than raises an event to any registered listeners, notifying them of the state change.

Figure 6:
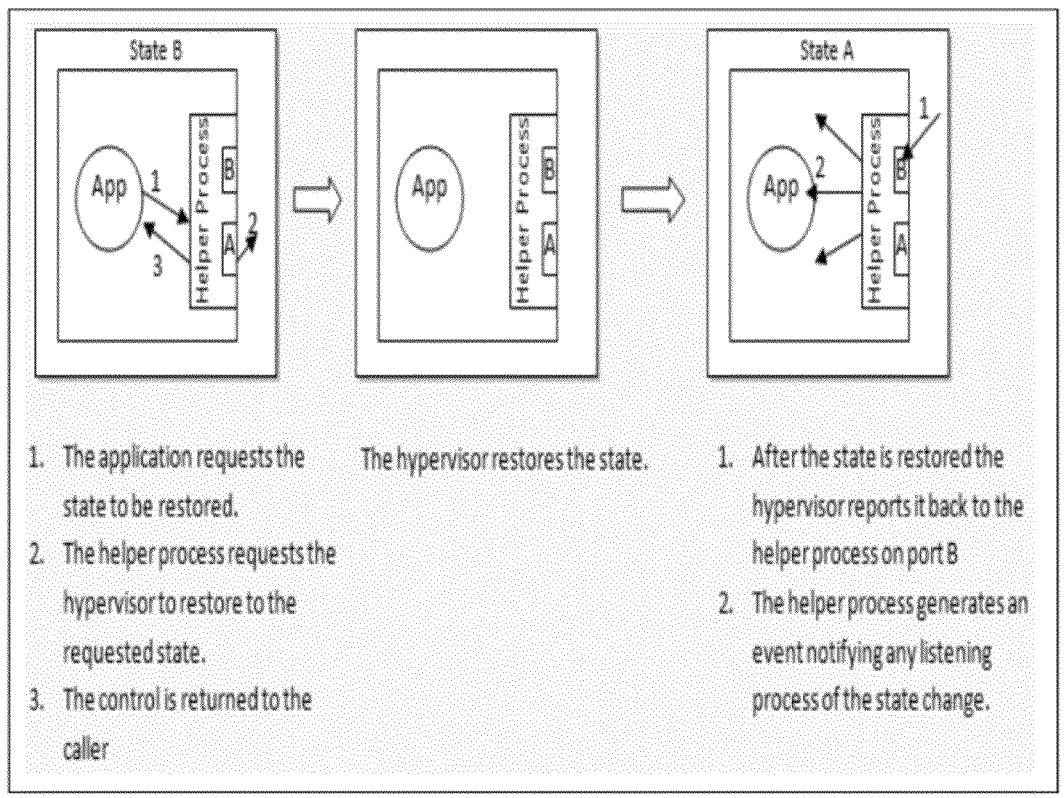
FIG. 6 is a diagram depicting example interactions of the techniques presented herein for restoring a VM to another state, according to an example embodiment.

FIG. 6 is a diagram depicting example interactions of the techniques presented herein for restoring a VM to another state, according to an example embodiment.

This process can also be utilized to change the state of the VM from one state to another. A request for a list of saved states maintained within the hypervisor can be made and a selection also made to switch among those saved states.

Figure 7:
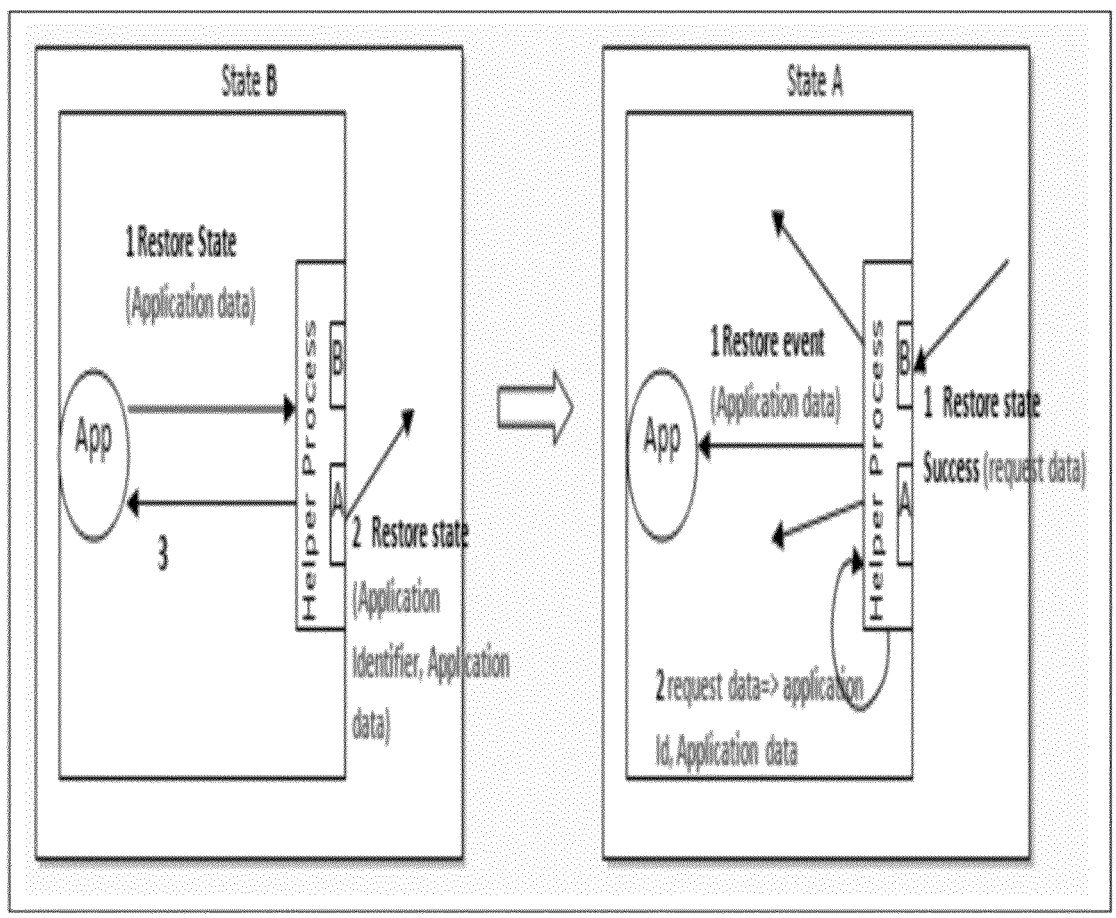
FIG. 7 is a diagram depicting example interactions of the techniques presented herein for message of a VM state, according to an example embodiment.

FIG. 7 is a diagram depicting example interactions of the techniques presented herein for message of a VM state, according to an example embodiment.

FIG. 7 depicts an information passing mechanism.

This technique can also be utilized as an intra-process as well as inter process communication mechanism across different VM states, by making the hypervisor retain the request data and sending the request data back while reporting success/failure events. This can be done as follows:

While a VM application requests a state change, the VM application sends some data with the request, which the VM application expects to get when the state is changed (shown in FIG. 7 as application data). The VM helper process can optionally tag this data with the application identifier of the application, which generated it as needed (the identifier is the name under which the application registers itself as a listener for the events from the helper process; this name is the same across states). The information is then passed to the hypervisor as additional data with the request. The hypervisor queues the request and the helper process returns control to the caller as explained above.

After the state change is complete, the hypervisor reports success/failure to the helper process on port B and in addition sends the data it had received when the request was made for state change. The helper process: extracts the application data from this data (given by hypervisor), generates the state change event, and passes this data as the event data. The VM application gets the data (if the data is registered for the event), which completes the whole state restoration process.

The VM application is running in both states and registered to the helper process as an event listener. Otherwise, the event generated after the restore containing the application data is ignored as the application is not listening for it.

It is now appreciated how managing VM states can be more efficiently and flexibly achieved with the techniques presented herein and above. The techniques permit the changing and saving of a VM state to be initiated from inside the VM itself. Blocking issues are resolved using asynchronous and event-based processing. State notifications are also provided to processes running inside the VM. Additionally, a VM process can send itself messages across VM state changes.

In some embodiments, the techniques presented herein can be used so that the VM can be reconfigured from within the VM itself. For example, if VM memory is being underutilized, a request can be made to the hypervisor (VMM) to reduce the memory allocated to the VM through the VM helper process described herein and above. This can be an asynchronous call where the VM helper process shuts temporarily shuts down the VM and the hypervisor reconfigures memory allocation based on the request and then restarts the VM. Also, VM applications can acquire more information about the host machine of the VM (e.g., available hard disk space, etc.); this information is acquired by the VM helper process, which interacts with the hypervisor, the hypervisor gathers the information and returns it to the VM helper process that then provides it to the VM applications.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method residing in a machine-readable storage medium and to execute on a processor, the method, comprising:
   receiving, by the processor, a request to save a state of a Virtual Machine (VM), the request received within a processing context of the VM and the request sent from a helper process processing on the VM and the helper process does not wait for response to sending the request, the request sent asynchronously and processed asynchronously by the processor;
   passing, by the processor, the request to a hypervisor that executes on the processor outside the processing context of the VM;
   detecting, by the processor, an event raised by the hypervisor indicating the state was saved for the VM; and
   notifying, by the processor, one or more VM applications executing within the processing context of the VM that the state was saved for the VM.

2. The method of claim 1, wherein receiving further includes receiving the request from a particular one of the one or more VM applications within the processing context of the VM, the particular one of the one or more VM applications is the helper process.

3. The method of claim 1, wherein passing further includes writing the request to a predefined memory region allocated to the VM that the hypervisor monitors.

4. The method of claim 1, wherein passing further includes one of:
   writing the request to a predefined port of the processor that the hypervisor listens on for communication coming from within the processing context of the VM; and
   writing the request to a virtual Input/Output (I/O) port of the VM that is accessible to the hypervisor outside the processing context of the VM.

5. The method of claim 1, wherein passing further includes including credentials with the request passed to the hypervisor that the hypervisor uses to authenticate the request to save the state of the VM.

6. The method of claim 1, wherein passing further includes asynchronously passing the request to the hypervisor and returning control back to the VM while the hypervisor processes the request.

7. The method of claim 1, wherein detecting further includes dynamically listening for the event on one of the following: a virtual port of the VM that is accessible to the hypervisor, a predefined port that the hypervisor writes the event to; and a predefined memory region of the VM that the hypervisor has access to write the event to.

8. A machine-implemented system, comprising:
   a Virtual Machine (VM) application implemented in a computer-readable storage medium and to execute on one or more processors within an internal processing context of a VM; and
   a VM helper process implemented in a computer-readable storage medium and to execute on the one or more processors within the internal processing context of the VM;
   wherein the VM application is configured to asynchronously issue a request to save a VM state to the VM helper process, the VM helper process is configured to asynchronously communicate outside the internal processing context of the VM with a VM Monitor (VMM) to have the VMM asynchronously save the state of the VM on behalf of the VM application.

9. The system of claim 8, wherein the VM application registers with the VM helper process to receive notifications from the VMM for the VM.

10. The system of claim 8, wherein the VM helper process is to communicate with the VMM via one or more of the following: a reserved portion of memory or storage reserved for the VM, a virtual Input/Output (I/O) port that the VMM has access to, and a predefined designated port that the VMM monitors.

11. The system of claim 8, wherein the VM application is configured to pass credentials to the VM helper process that the VM helper process communicates to the VMM and that the VMM uses to authenticate the VM application before saving the state on behalf of the VM application of the VM.

12. The system of claim 8, wherein the VM helper process is configured to asynchronously communicate with the VMM.

13. The system of claim 8, wherein the VM helper process is configured to notify the VM application when the VM helper process receives notice that the VMM has saved the state of the VM on behalf of the VM application.

14. A machine-implemented system, comprising
- a Virtual Machine (VM) implemented in a computer-readable storage medium and to execute on one or more processors; and
- a hypervisor implemented in a computer-readable storage medium and to execute on the one or more processors;
- wherein the hypervisor is configured to expose selective portions of its Application Programming Interface (API) to a VM helper process that executes inside a processing context of the VM, the hypervisor further configured to asynchronously perform one or more operations from the API on behalf of the VM helper process and asynchronously communicate results of performing those operations to the VM helper process.

15. The system of claim 14, wherein the hypervisor is configured to restore the VM to a previously saved state when processing a select one of the operations on behalf of the VM helper process.

16. The system of claim 14, wherein the hypervisor is configured to reconfigure the VM in response to parameters received from the VM helper process when processing a select one of the operations on behalf of the VM helper process.

17. The system of claim 14, wherein the hypervisor is configured to process parameter data when processing a select one of the operations on behalf of the VM helper process and communicate back to the VM helper process another set of data obtained from processing the select operation.

18. The system of claim 14, wherein the hypervisor is configured to receive communication from the VM helper process via a first predefined port within the VM and the hypervisor is configured to communicate the results back to the VM helper process via a second predefined port within the VM.

* * * * *